United States Patent
Yang et al.

(10) Patent No.: US 11,194,918 B2
(45) Date of Patent: Dec. 7, 2021

(54) DATA TRANSMISSION BASED ON VERIFICATION CODES

(71) Applicant: International Business Machines Corporation, Armonk, NY (US)

(72) Inventors: Bo Yang, Beijing (CN); Anca Sailer, Scarsdale, NY (US); Messaoud Benantar, Austin, TX (US); Ajay Mohindra, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 16/507,562

(22) Filed: Jul. 10, 2019

(65) Prior Publication Data

US 2021/0012019 A1    Jan. 14, 2021

(51) Int. Cl.
*G06F 21/00* (2013.01)
*G06F 21/60* (2013.01)
*H04L 29/06* (2006.01)

(52) U.S. Cl.
CPC ............ *G06F 21/606* (2013.01); *H04L 63/12* (2013.01)

(58) Field of Classification Search
CPC ................................ G06F 21/606; H04L 63/12
See application file for complete search history.

(56) References Cited

U.S. PATENT DOCUMENTS

| | | | |
|---|---|---|---|
| 8,397,275 B1 * | 3/2013 | Magdsick | G06F 21/31 726/2 |
| 9,563,763 B1 * | 2/2017 | Roth | G06F 21/36 |
| 10,225,252 B1 * | 3/2019 | Boer | G06F 21/6218 |
| 2007/0143624 A1 * | 6/2007 | Steeves | G06F 21/10 713/182 |
| 2010/0031341 A1 | 2/2010 | Loh | |
| 2020/0084037 A1 * | 3/2020 | Zhang | H04L 9/3239 |

FOREIGN PATENT DOCUMENTS

| | | | |
|---|---|---|---|
| WO | 2014059952 A1 | 4/2014 | |
| WO | WO-2019085699 A1 * | 5/2019 | ............ H04L 63/10 |

OTHER PUBLICATIONS

R. Anbarasi and S. Gunasekaran, "Enhanced Secure Data Transmission protocol for Cluster-based Wireless Sensor Networks," IEEE Sponsored 9th International Conference on Intelligent Systems and Control (ISCO)2015, 4 pages.

* cited by examiner

*Primary Examiner* — Kendall Dolly
(74) *Attorney, Agent, or Firm* — Patterson + Sheridan, LLP

(57) ABSTRACT

The present disclosure provides techniques for data transmission. According to one technique, a request from a data sender for sending data to a data receiver is received, wherein the request comprises a content indicating a verification code. Then, a first solution to the verification code based on the request can be obtained. The verification code can be sent to the data receiver. A second solution to the verification code can be received from the data receiver, wherein the second solution is generated by the data receiver. Transmission of the data from the data sender to the data receiver can be enabled in response to the first solution consistent with the second solution.

17 Claims, 6 Drawing Sheets

DATA TRANSMISSION BASED ON VERIFICATION CODES

BACKGROUND

The present invention relates to secure communication technology, and more specifically, to methods, systems, and computer program products for data transmission based on verification codes.

A storage system can be used to store data received from a data sender. When sensitive data is sent from the data sender to the storage system, it is important to make sure the sensitive data is safely transmitted and stored on the system.

SUMMARY

According to one embodiment, there is provided a computer-implemented method for data transmission. According to the computer-implemented method, a request from a data sender for sending data to a data receiver is received, wherein the request comprises a content indicating a verification code. Then, a first solution to the verification code based on the request can be obtained. The verification code can be sent to the data receiver. A second solution to the verification code can be received from the data receiver, wherein the second solution is generated by the data receiver. Transmission of the data from the data sender to the data receiver can be enabled in response to the first solution consistent with the second solution.

According to another embodiment, there is provided a computer system for data transmission. The computer system comprises one or more processors, a computer-readable memory coupled to the one or more processors. The computer-readable memory comprises instructions that when executed by the one or more processors perform actions of: receiving a request from a data sender for sending data to a data receiver, wherein the request comprises a content indicating a verification code; obtaining a first solution to the verification code based on the request; sending the verification code to the data receiver; receiving a second solution to the verification code from the data receiver, wherein the second solution is generated by the data receiver; and enabling transmission of the data from the data sender to the data receiver in response to the first solution consistent with the second solution.

According to another embodiment, there is provided a computer program product for data transmission. The computer program product comprises a computer readable storage medium having program instructions embodied therewith, the program instructions executable by a processor to cause the processor to perform actions of: receiving a request from a data sender for sending data to a data receiver, wherein the request comprises a content indicating a verification code; obtaining a first solution to the verification code based on the request; sending the verification code to the data receiver; receiving a second solution to the verification code from the data receiver, wherein the second solution is generated by the data receiver; and enabling transmission of the data from the data sender to the data receiver in response to the first solution consistent with the second solution.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
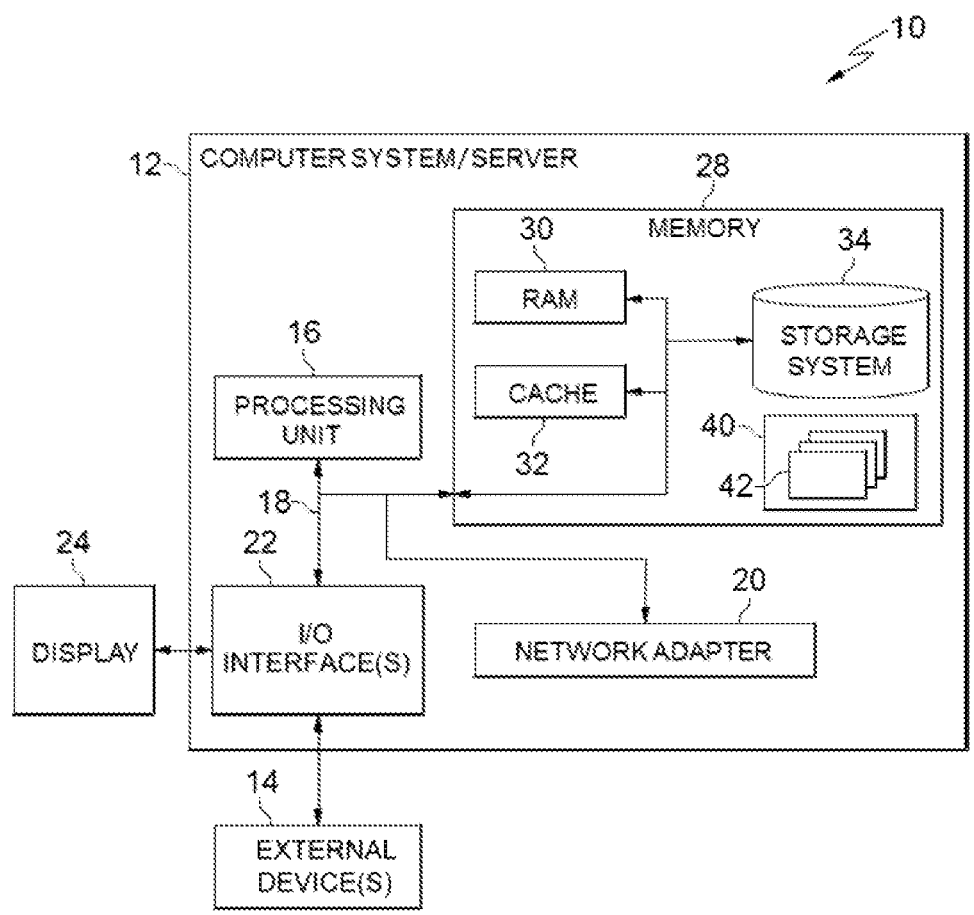
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
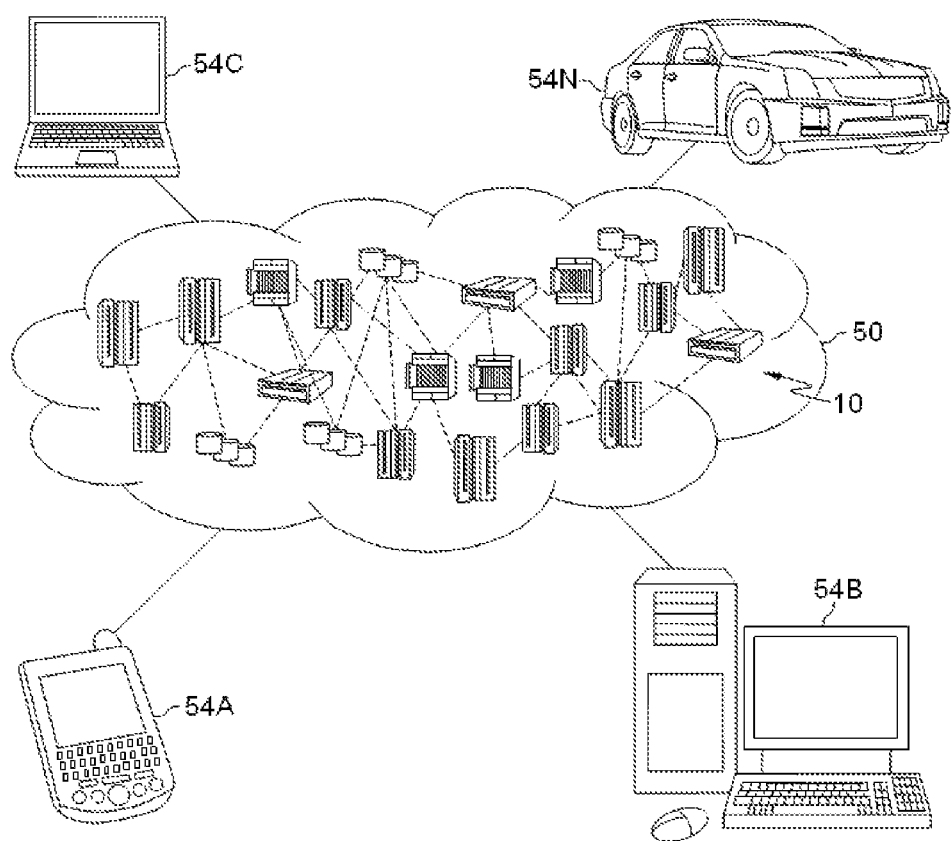
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
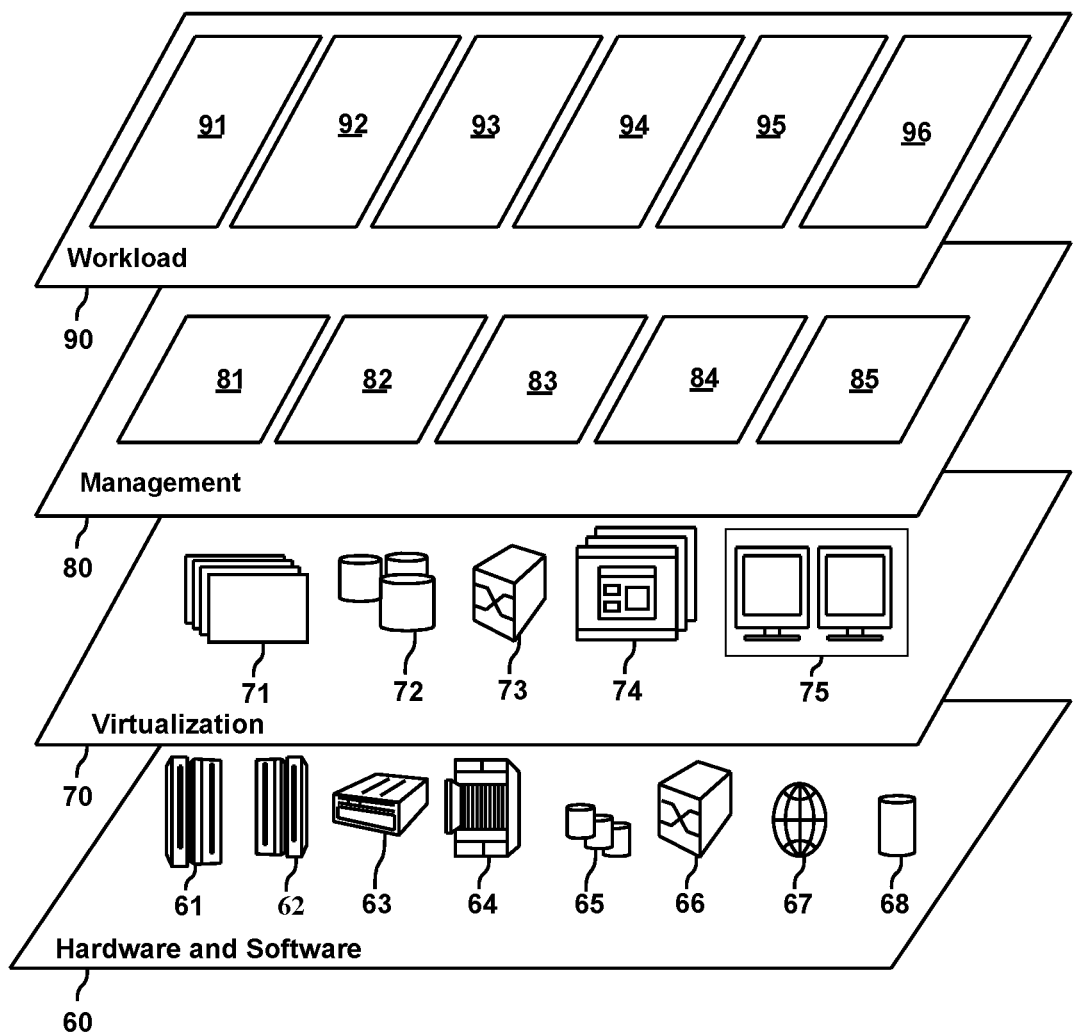
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data transmission 96.

To make sure a storage system is safe enough for storing data, a data sender can check the storage system's security status before setting up a connection for sending data, which can be done by checking a secure system list and reviewing a health report for the storage system. The storage system can be scanned with a scan plan (such as, weekly, daily, hourly, etc.), and a system monitor logic of the storage system can monitor and report the health status of the storage system to the data sender.

However, after the data sender sets up a connection with storage system, the data sender may continuously send data to the storage system, even if the storage system might be compromised during the data sending. There is a risk to expose sensitive data (such as, Personal Health Information (PHI) data, etc.) to the storage system before the compromise is fixed. Besides, if the data sender is compromised after setting up the connection with the storage system, the storage system may continuously receive dirty data from a faked data sender.

Figure 4:
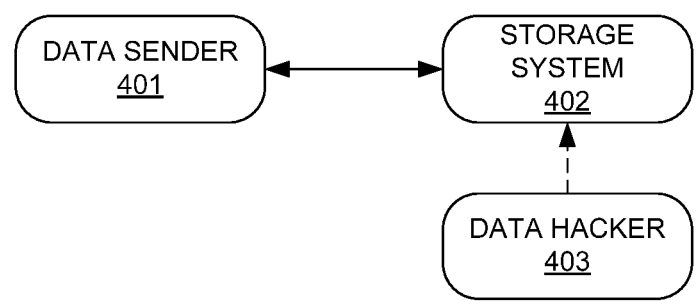
FIG. 4 depicts an example data transmission environment according to an embodiment of the present invention.

Referring now to FIG. 4, an example data transmission environment is depicted. In FIG. 4, a connection is established between a data sender 401 and a storage system 402. A data hacker 403 may hack into the storage system 402 during data transmission. The data sender 401 may not be aware that the storage system 402 is compromised and thus may continuously send data to the storage system 402. In this situation, the data may be exposed to the data hacker 403.

Figure 5:
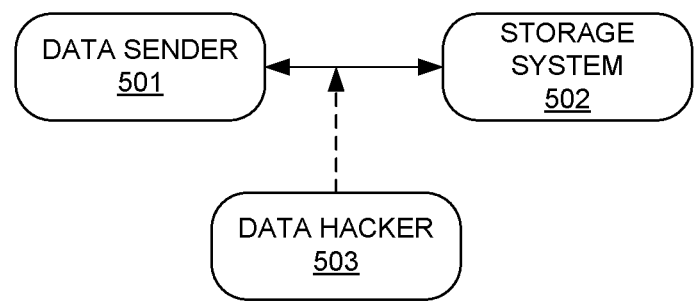
FIG. 5 depicts another example data transmission environment according to an embodiment of the present invention.

Referring to FIG. 5, another example data transmission environment is depicted. In FIG. 5, a connection is established between a data sender 501 and a storage system 502. A data hacker 503 may hack into the data sender 501 or intermediate devices between the data sender 501 and storage system 502 during the data transmission. The data hacker 503 may send faked data to the storage system 502, and the storage system 502 may not be able to distinguish the fake data.

Embodiments of the present invention provide approaches to implement secure data transmission between the data sender and the storage system.

Figure 6:
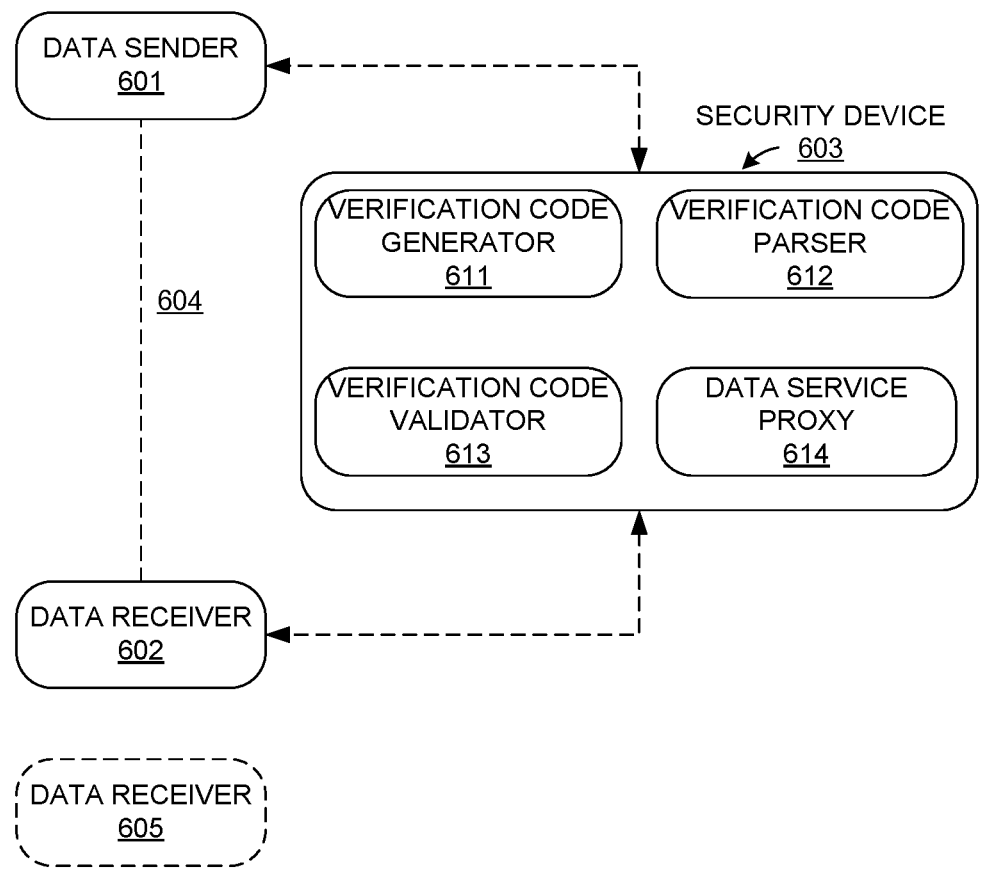
FIG. 6 depicts a schematic diagram of an example data transmission system according to an embodiment of the present invention.

Referring now to FIG. 6, an example data transmission system according to embodiments of the present invention is depicted. The data transmission system comprises a data sender 601, a data receiver 602 (such as, a storage system for storing date received from the data sender 601), and a security device 603. It shall be understood that the data transmission system may also comprise one or more components not shown in FIG. 6. The data sender 601, the data receiver 602, and the security device 603 are connected to each other via communication connections, such as, wired connection, wireless connection, etc.

The security device 603 may comprise one or more modules, for example, a verification code generator 611, a verification code parser 612, a verification code validator 613, and a data service proxy 614, etc. It should be understood that the security device 603 may also comprise one or more modules not shown in FIG. 6. It should also be understood that one or more modules shown in FIG. 6 may be omitted, combined as a single module, or divided into multiple sub modules.

According to embodiments of the present invention, the verification code generator 611 can generate a verification code and a verification code solving logic corresponding to the verification code. The pair of the verification code and the verification code solving logic may be assigned to a pair of a data sender and a data receiver, such as, the data sender 601 and the data receiver 602. The verification code can be generated using now known or to be developed technologies. For example, the verification code can comprise a Completely Automated Public Turing test to tell Computer and Human Apart (CAPTCHA) code (question), a reverse-CAPTCHA code (question), a verification question, a verification image (representing a verification question), etc. The verification code can be used to check whether a tested object can provide a correct solution to the verification code. The verification code can correspond to an original solution, for example, an original solution (answer) to the CAPTCHA code (question), the reverse-CAPTCHA code (question), the verification question, or the verification image, etc. In these embodiments, the original solution to the verification code can be obtained directly from the verification code. For example, for a verification question, an original solution can be a solution (answer) obtained after analyzing and answering the verification question using machine learning technologies. If the tested object does not have the verification code solving logic, the tested object can only provide the original solution, which is not a correct solution to the verification code. The verification code solving logic can be a set of instructions which indicates a manner to obtain a revised solution (correct solution) to the verification code based on the original solution to the verification code. Only if the tested object has deployed the verification code solving logic, the tested object can provide a correct solution to the verification code.

In some embodiments, a correct solution of the generated verification code can also be generated in parallel with generating the verification code and the verification code solving logic.

In some embodiments, the verification code may correspond to different security levels. For example, a relatively complicated verification code can be applied for data transmission requiring relatively high security level, and a relatively simple verification code can be applied for data transmission requiring a relatively low security level.

It shall be understood that though the verification code generator 611 is shown as an internal module of the security device 603, the verification code generator 611 can also be comprised in a separate device outside of the security device 603. For example, a user of the data transmission system can set verification codes and verification code solving logics using a verification code generator 611 deployed in a user device managed by the user. In some embodiments, the generated verification codes and verification code solving logics can be sent by the user from the user device to the security device 603.

In some embodiments, the generated verification code and the verification code solving logic can be stored on the security device 603 or a separate storage device which is accessible by the security device. In some other embodiments, a correct solution of the generated verification code can also be stored on the security device 603 or the separate storage device. Data structures can be set on the security device 603 or the separate storage device to store the generated verification code, the verification code solving logic, and/or the generated correct solution. A unique index can be assigned to the generated verification code and/or the verification code solving logic.

Referring to Table 1, example verification codes and verification code solving logics are illustrated. It should be understood that Table 1 is only used to describe embodiments of the present invention and not intended to limit scopes of the present invention. For example, the verification code generator 611 can generate a verification code "1+1=?", and corresponding verification code solving logic is "original solution added with 3", which means the original solution is 2 (the original solution can be obtained directly after analyzation of the verification code "1+1=?"), and the corrected solution to the verification code shall be 5 (original solution "2" added with 3). As another example, a generated verification code can be "3+root square (16)=?", and corresponding verification code solving logic is "original solution added with 5", which means the original solution is 7 (the original solution can be obtained directly after analyzation of the verification code "3+root square (16)=?"), and the corrected solution to the verification code is 12 (original solution "7" added with 5).

TABLE 1

| Index | Verification Code | Verification Code Solving Logic |
|---|---|---|
| 1 | 1 + 1 = ? | original solution added with 3 |
| 2 | 3 + root square (16) = ? | original solution added with 5 |
| ... | ... | ... |

According to embodiments of the present invention, the generated verification code can be sent to the data sender 601, and the generated verification code solving logic can be sent to the data receiver 602.

In some embodiment, an identifier corresponding to the generated verification code can be sent to the data sender

601 instead of the generated verification code. For example, the identifier corresponding to the generated verification code can be an index of the generated verification code in a list of verification codes (such as, indexes in Table 1).

In some other embodiment, an identifier corresponding to the generated verification code solving logic can be sent to the data receiver 602 instead of the generated verification code solving logic. The identifier corresponding to the generated verification code solving logic can be the index of the generated verification code solving logic (such as, the indexes in Table 1).

In some embodiments, the generated verification code solving logic can be deployed to the verification code parser 612 as a first verification code solving logic. In some embodiments, after the data receiver 602 receives the generated verification code solving logic, the generated verification code solving logic can be deployed in the data receiver 602 as a second verification code solving logic.

In some other embodiments, indexes and verification code solving logics can be previously stored on the data receiver 602. After the data receiver 602 receives the identifier corresponding to the generated verification code solving logic, a verification code solving logic can be queried using the identifier from the stored indexes and verification code solving logics, and then the queried verification code solving logic can be deployed in the data receiver 602 as the second verification code solving logic.

According to embodiments of the present invention, if the data sender 601 try to send data to the data receiver 602, the data sender 601 may send a request to the security device 603. In some embodiments, the request may comprise a content indicating a verification code previously received by the data sender 601 from the security device 603. As an example, the content in the request may comprise the verification code itself. The verification code comprised in the request corresponds to a target receiver. In some other embodiments, the content in the request may comprise an identifier corresponding to a verification code previously received by the data sender 601 from the security device 603. In some embodiments, the data sender 601 may send the request and data to be transmitted concurrently to the security device 603.

The security device 603 may receive the request from the data sender 601 and determine the verification code based on the request. In some embodiments, the security device 603 can obtain the verification code directly from the request if the content in the request comprises the verification code. In some other embodiments, the security device 603 can obtain the identifier from the request if the content in the request comprises the identifier corresponding to the verification code and then querying the stored verification codes to obtain the verification code using the identifier.

According to embodiments of the present invention, the verification code parser 612 of the security device 603 can obtain a first solution to the verification code based on the deployed first verification code solving logic and the verification code obtained based on the request received from the data sender 601. As an example, the verification code can be analyzed by the verification code parser 612 and an original solution of the verification code can be obtained using machine learning technologies or other Artificial Intelligence (AI) technologies. Then, the verification code parser 612 can apply the deployed first verification code solving logic to revise the original solution to obtain the first solution. In some other embodiments, a correct solution corresponding to the verification code can be queried by the verification code parser 612 and used as the first solution to the verification code.

According to embodiments of the present invention, the security device 603 can send the verification code to the data receiver 602. Then the data receiver 602 can use the received verification code and the second verification code solving logic deployed on the data receiver 602 (if exists) to generate a second solution to the received verification code. As an example, the received verification code can be analyzed by the data receiver 602 and an original solution to the verification code can be obtained. Then, the data receiver 602 can apply the deployed second verification code solving logic to revise the original solution to obtain the second solution. As a further example, if there is no active verification code solving logic deployed corresponding to the received verification code, the original solution to the verification code can be used by the data receiver 602 as the second solution.

According to embodiments of the present invention, the security device 603 can receive the second solution from the data receiver 602. Then, the verification code validator 613 may compare the first solution and the second solution. If the first solution and the second solution match with each other (for example, the first solution consists with the second solution), the data service proxy 614 in the security device 603 will enable the data to be transmitted from the data sender 601 to the data receiver 602.

In some embodiments, as the data to be transmitted is already received by the security device 603 in parallel with the request from the data sender 601, the security device 603 may send the data to be transmitted to the data receiver 602. In some other embodiments, the security device 603 may serve as a proxy, and set a direct or indirect data connection 604 between the data sender 601 and the data receiver 602, and the data can be transmitted via the direct or indirect data connection 604 to the data receiver 602.

In some embodiments, the second verification code solving logic is disabled by the data receiver 602 in response to the data receiver 602 being detected to be abnormal. The data receiver 602 may run monitor applications (such as, anti-virus software, intrusion detection software, etc.) to monitor its healthy status. If the monitor applications running on the data receiver 602 detects the data receiver 602 is abnormal (such as, the data receiver 602 is compromised, etc.), the monitor applications may disable the second verification code solving logic. In these embodiments, once the second verification code solving logic is disabled, the second verification code solving logic may not be recovered by the data receiver 602 without recovery instruction from the security device 603. As a further example, if the data receiver 602 receive a verification code from the security device 603, as the second verification code solving logic is disabled, the original solution to the verification code can be used by the data receiver 602 as the second solution and sent back to the security device 603.

In some embodiments, the security device 603 may receive reports periodically from the data receiver 602, wherein the reports indicate statuses of the data receiver. If the monitor applications running on the data receiver 602 detects the data receiver 602 is abnormal, the data receiver 602 may send a report indicating the data receiver 602 is abnormal to the security device 603. If the security device 603 receives a report indicating the data receiver 602 is abnormal, the security device 603 may not further send the verification code to the data receiver 602 after receiving the request from the data sender 601.

According to embodiments of the present invention, if activities of a data hacker on the data receiver 602 is detected by the data receiver 602, the data receiver 602 will determine its status as abnormal and disable the second verification code solving logic. As a result, when the data sender 601 tries to send data to the data receiver 602, as the data receiver 602 or the data hacker cannot provide a correct solution to the verification cade without the second verification code solving logic, the data will not be transmitted to the data receiver 602. As another example, if a hacker tries to send faked data to the data receiver 602, as the hacker can not provide a verification code to the security device 603, the faked data will not be transmitted.

According to embodiments of the present invention, in response to the first solution not consistent with the second solution, the security device 603 can send the verification code to another data receiver 605. The security device 603 can receive a third solution to the verification code from the data receiver 605. The third solution is generated by the data receiver 605 based on the verification code and a third verification code solving logic deployed in the data receiver 605 (if exists). The data can be transmitted from the data sender to the second data receiver in response to the first solution consistent with the third solution. Processes of interaction among the data sender 601, the security device 603 and the data receiver 605 are similar with those for the data sender 601, the security device 603 and the data receiver 602 mentioned above.

Figure 7:
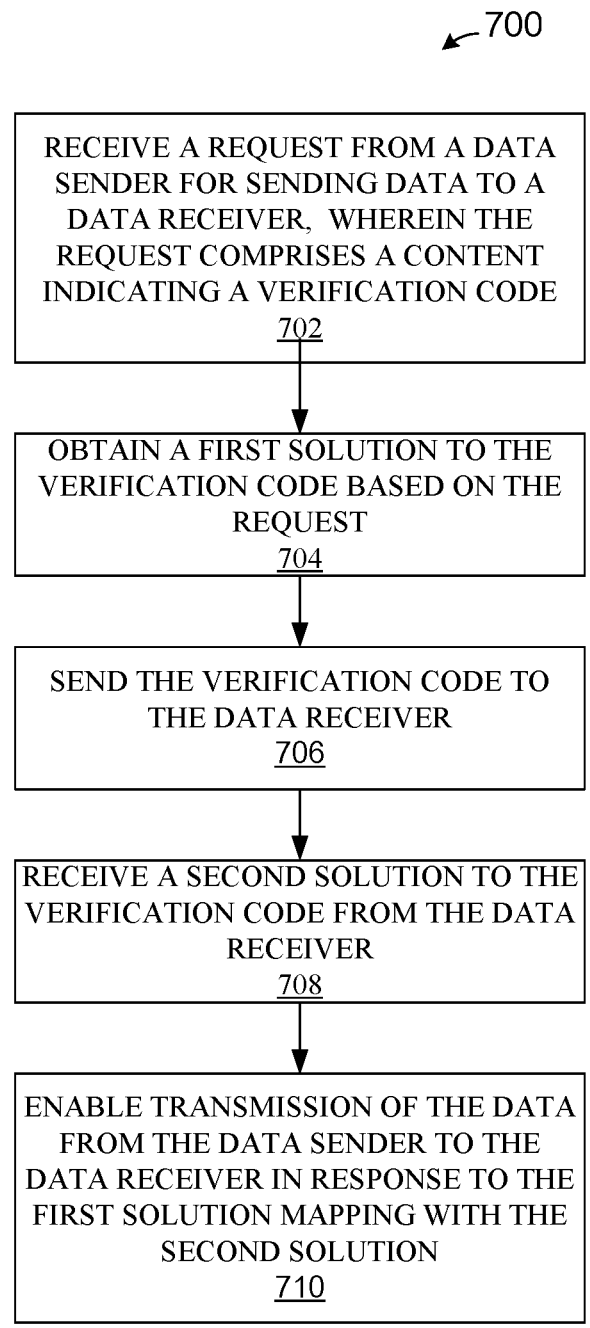
FIG. 7 depicts a flow chart of an example method for data transmission according to an embodiment of the present invention.

With reference to FIG. 7, a method 700 for data transmission is illustrated according to embodiments of the invention. The method 700 can be implemented by the computer system/server 12 of FIG. 1 or a computer node 10 in a cloud system. The method 700 can also be implemented by the security device 603 of FIG. 6. It should be noted that the method 700 is only illustrative and is not intended to suggest any limitation as to the scope of use or functionality of embodiments of the present invention.

At step 702, a request from a data sender for sending data to a data receiver is received. The request comprises a content indicating a verification code. At step 704, a first solution to the verification code based on the request can be obtained. At step 706, the verification code can be sent to the data receiver. At step 708, a second solution to the verification code can be received from the data receiver. The second solution is generated by the data receiver based on the received verification code. Then, at step 710, transmission of the data from the data sender to the data receiver can be enabled in response to the first solution consistent with the second solution.

It should be noted that the processing of object detection according to embodiments of the present invention could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for data transmission, comprising:
    receiving, by one or more processors, a request from a data sender for sending data to a data receiver, wherein the request comprises content indicating a verification code;
    obtaining, by the one or more processors, a first solution to the verification code based on the request, comprising:
        at least one of: (i) extracting, by the one or more processors, the verification code from the request, based on the content comprising the verification code, or (ii) acquiring, by the one or more processors, the verification code, using an identifier corresponding to the verification code, based on the content comprising the identifier corresponding to the verification code; and
        obtaining, by the one or more processors, (i) the first solution to the verification code based on the verification code, and (ii) verification code solving logic corresponding to the verification code, wherein the verification code solving logic indicates a manner to obtain a revised solution based on an original solution to the verification code;
    sending, by the one or more processors, the verification code to the data receiver;
    receiving, by the one or more processors, a second solution to the verification code from the data receiver, wherein the second solution is generated by the data receiver based on the verification code and a second verification code solving logic corresponding to the verification code sent to the data receiver; and
    enabling, by the one or more processors, transmission of the data from the data sender to the data receiver in response to the first solution consistent with the second solution.

2. The computer-implemented method of claim 1, wherein obtaining the first solution to the verification code based on the request comprises:
    querying, by one or more processors, previously stored solutions using the content indicating the verification code to obtain the first solution to the verification code.

3. The computer-implemented method of claim 1, wherein the second verification code solving logic indicates a manner to obtain a second revised solution based on the original solution to the verification code.

4. The computer-implemented method of claim 3, wherein the second verification code solving logic is disabled in response to the data receiver being detected to be abnormal.

5. The computer-implemented method of claim 1, further comprises:
    generating, by one or more processors, the verification code and the verification code solving logic corresponding to the verification code for the data sender and the data receiver; and
    deploying, by one or more processors, the generated verification code solving logic as the first verification code solving logic.

6. The computer-implemented method of claim 5, further comprises:
    sending, by one or more processors, the generated verification code or an identifier corresponding to the generated verification code to the data sender; and
    sending, by one or more processors, the generated verification code solving logic or an identifier corresponding to the generated verification code solving logic to the data receiver, wherein the generated verification code solving logic or a verification code solving logic obtained by the data receiver based on the identifier corresponding to the generated verification code solving logic is deployed in the data receiver as the second verification code solving logic.

7. The computer-implemented method of claim 1, further comprises:
in response to the first solution not being consistent with the second solution:
sending, by one or more processors, the verification code to a second data receiver;
receiving, by one or more processors, a third solution to the verification code from the second data receiver, wherein the third solution is generated by the second data receiver; and
enabling, by one or more processors, transmission of the data from the data sender to the second data receiver in response to the first solution consistent with the third solution.

8. A computer system for object detection, comprising:
one or more processors;
a computer-readable memory coupled to the processors, the computer-readable memory comprising instructions that when executed by the processors perform an operation, comprising:
receiving a request from a data sender for sending data to a data receiver, wherein the request comprises content indicating a verification code;
obtaining a first solution to the verification code based on the request, comprising:
at least one of: (i) extracting the verification code from the request, based on the content comprising the verification code, or (ii) acquiring the verification code, using an identifier corresponding to the verification code, based on the content comprising the identifier corresponding to the verification code; and
obtaining (i) the first solution to the verification code based on the verification code, and (ii) verification code solving logic corresponding to the verification code, wherein the verification code solving logic indicates a manner to obtain a revised solution based on an original solution to the verification code;
sending the verification code to the data receiver;
receiving a second solution to the verification code from the data receiver, wherein the second solution is generated by the data receiver based on the verification code and a second verification code solving logic corresponding to the verification code sent to the data receiver; and
enabling transmission of the data from the data sender to the data receiver in response to the first solution consistent with the second solution.

9. The computer system of claim 8, wherein obtaining the first solution to the verification code based on the request comprises:
querying previously stored solutions using the content indicating the verification code to obtain the first solution to the verification code.

10. The computer system of claim 8, wherein the second verification code solving logic indicates a manner to obtain a second revised solution based on the original solution to the verification code.

11. The computer system of claim 10, wherein the second verification code solving logic is disabled in response to the data receiver being detected to be abnormal.

12. The computer system of claim 8, where the operation further comprises:
generating the verification code and a verification code solving logic corresponding to the verification code for the data sender and the data receiver; and
deploying the generated verification code solving logic as the first verification code solving logic.

13. The computer system of claim 12, where the operation further comprises:
sending the verification code or an identifier corresponding to the verification code to the data sender; and
sending the generated verification code solving logic or an identifier corresponding to the generated verification code solving logic to the data receiver, wherein the generated verification code solving logic or a verification code solving logic obtained by the data receiver based on the identifier corresponding to the generated verification code solving logic is deployed in the data receiver as the second verification code solving logic.

14. The computer system of claim 8, where the operation further comprises:
in response to the first solution not being consistent with the second solution:
sending the verification code to a second data receiver;
receiving a third solution to the verification code from the second data receiver, wherein the third solution is generated by the second data receiver; and
enabling transmission of the data from the data sender to the second data receiver in response to the first solution consistent with the third solution.

15. A computer program product, comprising a computer readable storage medium having program instructions embodied therewith, the program instructions when executed by a processor causing the processor to perform an operation, comprising:
receiving a request from a data sender for sending data to a data receiver, wherein the request comprises content indicating a verification code;
obtaining a first solution to the verification code based on the request, comprising:
at least one of: (i) extracting the verification code from the request, based on the content comprising the verification code, or (ii) acquiring the verification code, using an identifier corresponding to the verification code, based on the content comprising the identifier corresponding to the verification code; and
obtaining (i) the first solution to the verification code based on the verification code, and (ii) verification code solving logic corresponding to the verification code, wherein the verification code solving logic indicates a manner to obtain a revised solution based on an original solution to the verification code;
sending the verification code to the data receiver;
receiving a second solution to the verification code from the data receiver, wherein the second solution is generated by the data receiver based on the verification code and a second verification code solving logic corresponding to the verification code sent to the data receiver; and
enabling transmission of the data from the data sender to the data receiver in response to the first solution consistent with the second solution.

16. The computer program product of claim 15, wherein the second verification code solving logic indicates a manner to obtain a second revised solution based on an original solution to the verification code.

17. The computer program product of claim 16, wherein the second verification code solving logic is disabled in response to the data receiver being detected to be abnormal.

* * * * *